United States Patent
Wu et al.

(10) Patent No.: US 11,140,245 B2
(45) Date of Patent: Oct. 5, 2021

(54) PACKET PROCESSING METHOD AND APPARATUS

(71) Applicant: HUAWEI TECHNOLOGIES CO., LTD., Guangdong (CN)

(72) Inventors: Yuefeng Wu, Nanjing (CN); Jianjun Jiang, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 15 days.

(21) Appl. No.: 16/828,228

(22) Filed: Mar. 24, 2020

(65) Prior Publication Data

US 2020/0220953 A1 Jul. 9, 2020

Related U.S. Application Data

(63) Continuation of application No. PCT/CN2018/102850, filed on Aug. 29, 2018.

(30) Foreign Application Priority Data

Nov. 22, 2017 (CN) .......................... 201711175324.9

(51) Int. Cl.
*H04L 29/06* (2006.01)
*H04L 12/44* (2006.01)
(Continued)

(52) U.S. Cl.
CPC .............. *H04L 69/22* (2013.01); *H04L 12/44* (2013.01); *H04L 45/742* (2013.01); *H04L 47/2441* (2013.01)

(58) Field of Classification Search
None
See application file for complete search history.

(56) References Cited

U.S. PATENT DOCUMENTS

2008/0279219 A1  11/2008  Wu et al.
2009/0201898 A1   8/2009  Gong et al.
(Continued)

FOREIGN PATENT DOCUMENTS

CN  101030943 A  9/2007
CN  101990238 A  3/2011
(Continued)

OTHER PUBLICATIONS

Office Action dated May 7, 2020, issued in counterpart CN Application No. 201711175324.9, with English translation (10 pages).
(Continued)

*Primary Examiner* — Christine T Duong
(74) *Attorney, Agent, or Firm* — Westerman, Hattori, Daniels & Adrian, LLP

(57) ABSTRACT

A packet processing method and apparatus are presented. The method includes: generating, by a first node, a first packet based on first data of the first node, where the packet header of the first packet includes a service type, a final destination address, and residual times to aggregation (RTA); when the RTA of the first packet is not 0, determining, by the first node, a remaining capacity in a first cache corresponding to the service type and the final destination address; and when a data length of the first packet is not greater than the remaining capacity, aggregating, by the first node, the first packet and the second packet into a third packet, where the RTA of the third packet is a minimum value in the RTA of the second packet and a value obtained after 1 is subtracted from the RTA of the first packet.

10 Claims, 10 Drawing Sheets

(51) Int. Cl.
  *H04L 12/747* (2013.01)
  *H04L 12/851* (2013.01)

(56) References Cited

U.S. PATENT DOCUMENTS

| | | | |
|---|---|---|---|
| 2013/0089003 A1* | 4/2013 | Liang | H04L 67/12 370/255 |
| 2013/0215850 A1 | 8/2013 | Zakrzewski | |
| 2015/0295841 A1 | 10/2015 | Neelisetty et al. | |
| 2016/0381087 A1 | 12/2016 | Addepalli et al. | |
| 2017/0078195 A1* | 3/2017 | Raman | H04L 45/308 |

FOREIGN PATENT DOCUMENTS

| | | | |
|---|---|---|---|
| CN | 102984709 A | 3/2013 | |
| CN | 103179613 A | 6/2013 | |
| CN | 103281726 A | 9/2013 | |
| WO | 2016160040 A1 | 10/2016 | |

OTHER PUBLICATIONS

International Search Report dated Nov. 22, 2018, issued in counterpart Application No. PCT/CN2018/102850 with English translation (11 pages).

XP-002520934 Ashish Jain et al., "Benefits of Packet Aggregation in Ad-Hoc Wireless Network", CU-CS-960-03, University of Colorado at Boulder, Aug. 2003. (25 pages).

Extended (Supplementary) European Search Report dated Sep. 28, 2020, issued in counterpart EP Application No. 18880781.2. (11 pages).

* cited by examiner

PACKET PROCESSING METHOD AND APPARATUS

CROSS-REFERENCE TO RELATED APPLICATIONS

This application is a continuation of International Application No. PCT/CN2018/102850, filed on Aug. 20, 2018, which claims priority to Chinese Patent Application No. 201711175324.9, filed on Nov. 22, 2017. Both of the aforementioned applications are hereby incorporated by reference in their entireties.

TECHNICAL FIELD

This application relates to the field of communications technologies, and in particular, to a packet processing method and apparatus.

BACKGROUND

With development of wireless personal area network (WPAN) technologies, a wireless mesh network and a mobile ad hoc network that perform multi-hop extension based on such technologies are widely used. In topology structures formed by the two types of networks, a tree structure usually appears, that is, one node in a network is connected to a plurality of subnodes, and some of the subnodes are also connected to a plurality of subnodes. Currently, a plurality of types of data (tor example, a heartbeat packet or a sensor packet) are transmitted end to end in a unicast manner. When the data is transmitted in the upstream direction by using the wireless multi-hop network, traffic of upstream packets is higher in a transmission path closer to a root node. In addition, bandwidth bottleneck of nodes will become more prominent in a larger network, which may probably affect normal running of a service.

SUMMARY

This application provides a packet processing method and apparatus.

According to a first aspect, a packet processing method is provided. The method includes: generating, by a first node, a first packet based on first data of the first node, where the first packet includes a packet header, and the packet header includes a service type, a final destination address, and residual times to aggregation RTA; when the RTA of the first packet is not 0, determining, by the first node, a remaining capacity in a first cache corresponding to the service type and the final destination address, where the first cache stores a second packet, the second packet has a service type and a final destination address that are the same as those of the first packet, and the second packet may be a packet received by the first node from a subnode of the first node, or the second packet may be a packet generated by the first node based on second data of the first packet; and when a data length of the first packet is not greater than the remaining capacity, aggregating, by the first node, the first packet and the second packet into a third packet, where a packet header of the third packet includes the service type, the final destination address, and the RTA of the third packet, and the RTA of the third packet is a minimum value in the RTA of the second packet and a value obtained after 1 is subtracted from the RTA of the first packet.

According to the packet processing method, the first node generates the first packet based on the data of the first node, sets the final destination address, the service type, and residual times to aggregation RTA for the first packet, and determines the remaining capacity in the first cache corresponding to a combination of the final destination address and the service type, and the second packet stored in the first cache. When the data length of the first packet is not greater than the remaining capacity, the first packet and the second packet in the first cache are aggregated into the third packet. Times to aggregation and an aggregation data length of a packet are controlled, so as to effectively limit a transfer delay and an aggregation depth of the packet within a proper range, alleviate a bandwidth pressure of a transmission path between nodes, and ensure normal running of a service.

In a possible implementation, the method further includes: when the RTA of the third packet is 0, sending, by the first node, the third packet to a node corresponding to the final destination address after a preset aggregation time is exceeded; or when the RTA of the third packet is not 0, sending, by the first node, the third packet to a parent node of the first node after the preset aggregation time is exceeded. In this manner, when the RTA of the third packet is 0, further aggregation processing cannot be performed on the third packet, and the third packet is sent to the node corresponding to the final destination address in time, so as to control an aggregation delay of the packet within a proper range: or when the RTA of the third packet is not 0, the third packet is sent to the parent node of the first node, so as to provide the third packet with a further aggregation possibility.

In a possible implementation, the method further includes: when the RTA of the first packet is 0, sending, by the first node, the first packet to a node corresponding to the final destination address within a predetermined time. In this manner, RTA of a packet of a delay-sensitive service is set to 0, so that the packet can be sent to the node corresponding to the final destination address in time to ensure the normal running of the service.

In a possible implementation, the method further includes: when the data length of the first packet is greater than the remaining capacity, sending, by the first node, the first packet to a parent node of the first node within a predetermined time. In this manner, when the data length of the first packet is greater than the remaining capacity in the first cache on the first node, the first packet is forwarded to the parent node of the first node in time, so that the first packet can be aggregated with a packet on another node in time.

According to a second aspect, a packet processing method is provided. The method includes: receiving, by a first node, a fourth packet sent by a first subnode of the first node, where the fourth packet includes a packet header and a network Layer encapsulation header, the packet header includes a service type, a final destination address, and residual times to aggregation RTA, and the network layer encapsulation header includes a network destination address; when the network destination address is an address of the first node, determining, by the first node, a remaining capacity in a fourth cache corresponding to the service type and the final destination address, where the fourth cache stores a fifth packet, the fifth packet has a service type and a final destination address that are the same as those of the fourth packet, and the fifth packet may be a packet received by the first node, or the fifth packet may be a packet generated by the first node based on data of the first node; and when a data length of the fourth packet is not greater than the remaining capacity, aggregating, by the first node, the fourth packet and the fifth packet into a sixth packet, where a packet header of the sixth packet includes the service type, the final destination address, and the RTA of the sixth packet, and the RTA of the sixth packet is a minimum value in the RTA of the fifth packet and a value obtained after 1 is subtracted from the RTA of the fourth packet.

According to the packet processing method, the first node receives the fourth packet, and determines the remaining capacity in the fourth cache corresponding to a combination of the final destination address and the service type of the fourth packet, and the fourth cache stores the fifth packet. When the data length of the fourth packet is not greater than the remaining capacity, the fourth packet and the fifth packet are aggregated into the sixth packet. Times to aggregation and an aggregation data length of a packet are controlled, so as to effectively limit a transfer delay of the packet within a proper range, alleviate a bandwidth pressure of a transmission path between nodes, and ensure normal running of a service.

In a possible implementation, the method further includes: when the network destination address is not the address of the first node, sending, by the first node, the fourth packet to a node corresponding to the network destination address within a predetermined time. In this manner, when determining, at a network layer, that the network destination address of the fourth packet is not the address of the first node, the first node does not extract the fourth packet into an application layer, but directly forwards the fourth packet, so as to control an aggregation delay of the packet within a proper range.

In a possible implementation, the method further includes: when the RTA of the sixth packet is 0, sending, by the first node, the sixth packet to a node corresponding to the final destination address after a preset aggregation time is exceeded; or when the RTA of the sixth packet is not 0, sending, by the first node, the sixth packet to a parent node of the first node after the preset aggregation time is exceeded. In this manner, when the RTA of the sixth packet is 0, further aggregation processing cannot be performed on the sixth packet; and the sixth packet is sent to the node corresponding to the final destination address in time, so as to control the aggregation delay of the packet within a proper range; or when the RTA of the sixth packet is not 0, the sixth packet is sent to the parent node of the first node, so as to provide the sixth packet with a further aggregation possibility.

In a possible implementation, the method further includes: when the data length of the fourth packet is greater than the remaining capacity, sending, by the first node, the fourth packet to a parent node of the first node within the predetermined time. In this manner, when the data length of the fourth packet is greater than the remaining capacity in the first cache on the first node, the fourth packet is forwarded to the parent node of the first node in time, so that the first packet can be aggregated with a packet on another node in time.

According to a third aspect, a packet processing apparatus is provided, applied to a first node. The apparatus is configured to implement the method according to any one of the implementations in the first aspect. The apparatus includes: a generation unit, configured to generate a first packet based on data of the first node, where the first packet includes a packet header, and the packet header includes a service type, a final destination address, and residual times to aggregation RTA; a determining unit, configured to: when the RTA of the first packet is not 0, determine a remaining capacity in a first cache corresponding to the service type and the final destination address, where the first cache stores a second packet, and the second packet has a service type and a final destination address that are the same as those of the first packet; and a processing unit, configured to: when a data length of the first packet is not greater than the remaining capacity, aggregate the first packet and the second packet into a third packet, where a packet header of the third packet includes the service type, the final destination address, and the RTA of the third packet, and the RTA of the third packet is a minimum of the RTA of the second packet and a value obtained after 1 is subtracted from the RTA of the first packet (the RTA of the first packet minus one).

In a possible implementation, the apparatus further includes: a sending unit, configured to: when the RTA of the third packet is 0, send the third packet to a node corresponding to the final destination address after a preset aggregation time is exceeded; or when the RTA of the third packet is not 0, send the third packet to a parent node of the first node after a preset aggregation time is exceeded.

In a possible implementation, the apparatus further includes: a sending unit, configured to: when the RTA of the first packet is 0, send the first packet to a node corresponding to the final destination address within a predetermined time.

In a possible implementation, the apparatus further includes: a sending unit, configured to: when the data length of the first packet is greater than the remaining capacity, send the first packet to a parent node of the first node within a predetermined time.

According to a fourth aspect, a packet processing apparatus is provided, applied to a first node. The apparatus is configured to implement the method according to any one of the implementations in the second aspect. The apparatus includes: a receiving unit, configured to receive a fourth packet sent by a subnode the first node, where the fourth packet includes a packet header and a network layer encapsulation header, the packet header includes a service type, a final destination address, and residual times to aggregation RTA, and the network layer encapsulation header includes a network destination address; a determining unit, configured to: when the network destination address is an address of the first node, determine a remaining capacity in a fourth cache corresponding to the service type and the final destination address, where the fourth cache stores a fifth packet, and the fifth packet has a service type and a final destination address that are the same as those of the fourth packet; and a processing unit, configured to: when a data length of the fourth packet is not greater than the remaining capacity, aggregate the fourth packet and the fifth packet into a sixth packet, where a packet header of the sixth packet includes the service type, the final destination address, and the RTA of the sixth packet, and the RTA of the sixth packet is a minimum value in the RTA of the fifth packet and a value obtained after 1 is subtracted from the RTA of the fourth packet.

In a possible implementation, the apparatus further includes: a sending unit, configured to: when the network destination address is not the address of the first node, send the fourth packet to a node corresponding to the network destination address within a predetermined time.

In a possible implementation, the apparatus further includes: a sending unit, configured to: when the RTA of the sixth packet is 0, send the sixth packet to a node corresponding to the final destination address after a preset aggregation time is exceeded; or when the RTA of the sixth packet is not 0, send the sixth packet to a parent node of the first node after a preset aggregation time is exceeded.

In a possible implementation, the apparatus further includes: a sending unit, configured to: when the data length of the fourth packet is greater than the remaining capacity, send the fourth packet to a parent node of the first node within the predetermined time.

According to a fifth aspect, a computer readable storage medium is provided, and a computer program is stored in the computer readable storage medium. When the computer program is executed, on a computer, the computer performs the method according to any one of the implementations in the first aspect; or when the computer program is executed on a computer, the computer performs the method according to any one of the implementations in the second aspect.

According to a sixth aspect, a computing device is provided. The memory stores executable code. When the processor executes the executable code, the method according to any one of the implementations in the first aspect is implemented; or when the processor executes the executable code, the method according to any one of the implementations in the second aspect is implemented.

DESCRIPTION OF EMBODIMENTS

The following describes the technical solutions in the embodiments of the present invention with reference to the accompanying drawings in the embodiments of the present invention.

It should be noted that nodes in the embodiments of the present invention may be any device that has a computing and storage capability, such as a mobile phone, a tablet computer, a personal computer (PC), a notebook computer, a server, a workstation, a printer, a gateway, and a router. A plurality of nodes may access each other by using a network, and each node has a unique network address. In addition, each function of the nodes mentioned in the embodiments of the present invention may be implemented by a logical node running on at least one device.

Networks in the embodiments of the present invention may be any network that has a tree structure, including a wireless network and a wired network. The wireless network may be a wireless mesh network or a mobile ad hoc network. The wired network may be a network that is composed of a plurality of routers and a plurality of switches and that has a tree structure.

Packets in the embodiments of the present invention may be a plurality of types of packets, such as a heartbeat packet, a real-time sensor packet, or a historical sensor packet.

Figure 1:
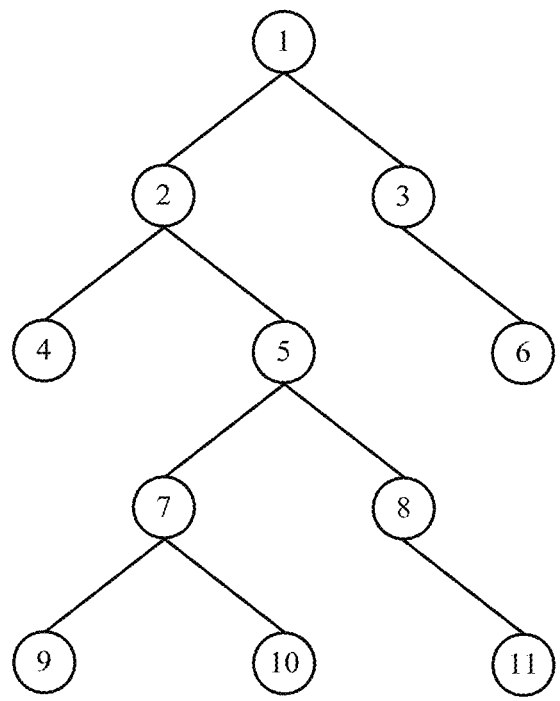
FIG. 1 is a diagram of a tree network topology structure in the related art.

In a tree network, a node has definite uplink and downlink communication directions. In an upstream direction, subnodes send data to their common parent node; and in a downstream direction, a parent node sends data to a subnode of the parent node. For example, as shown in a tree structure in FIG. 1, when data is sent from any one or more of node 2 to node 11 to node 1, uplink communication; and when data is sent from the node 1 to any one or more of the node 2 to node 11, it is downlink communication.

Figure 2:
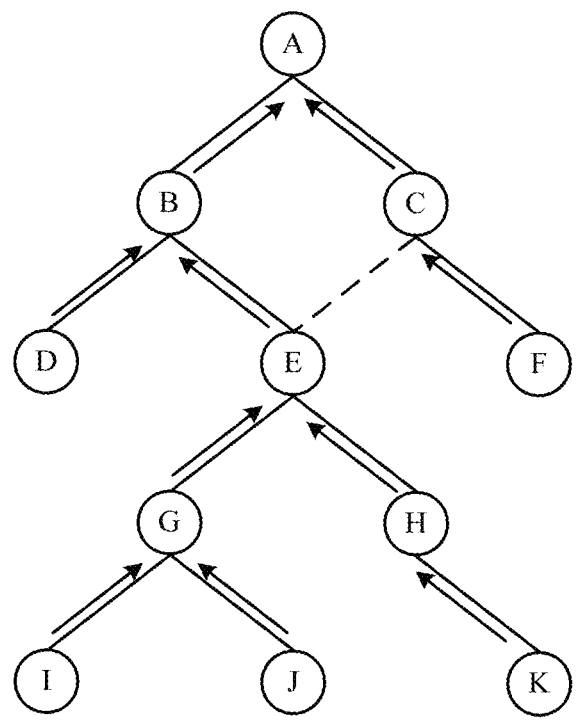
FIG. 2 is a schematic diagram of an application scenario of a packet processing method according to an embodiment of the present invention.

FIG. 2 is a schematic diagram of an application scenario of a packet processing method according to an embodiment of the present invention. In FIG. 2, node A is a root node of node B to node K, the node B is a parent node (which may also be referred to as a higher-level node) of node E, and node D and the node E are subnodes (which may also be referred to as lower-level nodes) of the node B. Generally, each node has one timer. In a set timer period, a node may receive a packet from a subnode of the node, or may construct a packet based on data of the node. After the timer expires, the received packet and/or the constructed packet by the node are sent to a parent node (or referred to as a higher-level node). For example, in FIG. 2, in a set single period, the node E receives a packet from node G and node H, and constructs a packet based on data of the node E. After the timer expires, the node E sends the packet received from the node G and the node H and the constructed packet based on the data of the node F to a parent node of the node E, that is, node B or node C. A solid line between the node E and the node B represents that the path is an actual path, and a dashed line between the node E and the node C represents that the path is an alternative path.

In the uplink communication process, the packet processing method in this embodiment of the present invention can be used. A first node may construct a first packet based on data of the first node, set a service type, a final destination address, and residual times to aggregation RTA for the first packet, and determine a remaining capacity in a first cache corresponding to a combination of the service type and the final destination address, where the first cache stores a second packet. When a data length of the first packet is not greater than the remaining capacity, the first node aggregates the first packet and the second packet into a third packet. Times to aggregation and an aggregation data length of a packet are controlled, so as to effectively limit a transfer delay of the packet within a proper range, alleviate a bandwidth pressure of a transmission path between nodes, and ensure normal running of a service.

Figure 3:
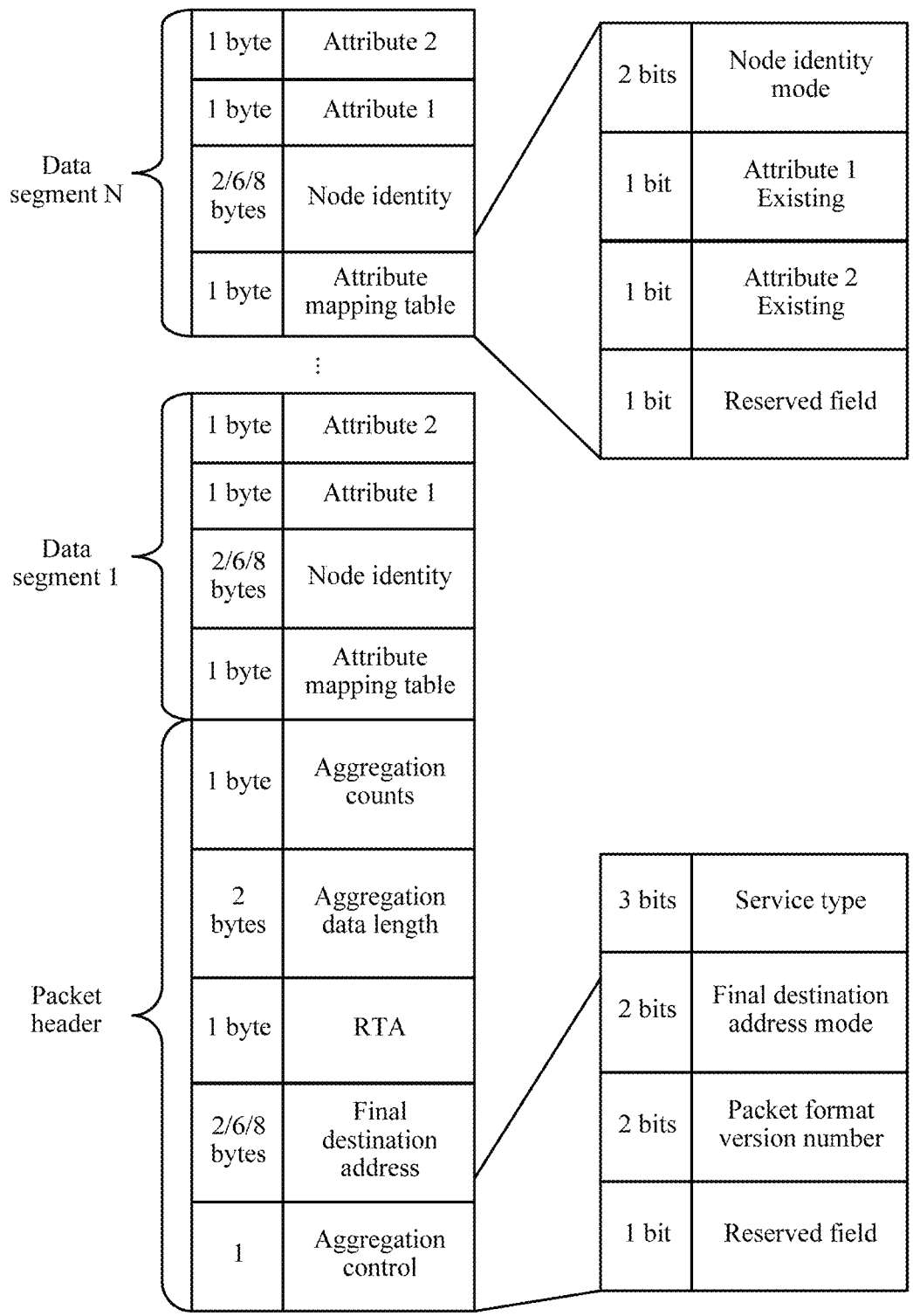
FIG. 3 is a schematic diagram of a packet structure according to an embodiment of the present invention.

The following first describes a packet structure according to the embodiments of the present invention. FIG. 3 shows a packet structure that may be aggregated by using a packet processing method according to the embodiments of the present invention. The packet may include an aggregation packet header (Packet Header) and an aggregation data segment (Data Segment).

The aggregation packet header may include aggregation control (Aggregation Control), a final destination address (Final Destination Address), residual times to aggregation (Residual Times to Aggregation, RTA), an aggregation data length (Data length), and aggregation counts (Aggregation Counts), and their byte counts (Bytes) may be 1, 2/6/8, 1, 2, and 1 respectively. The final destination address of the packet may be one of a 16-bit address (Short Address), a 48-bit extended unique identifier (EUI-48), and a 64-bit extended unique identifier (EUI-64) that respectively need to occupy 2 bytes, 6 bytes, and 8 bytes and that are defined by the Institute of Electrical and Electronics Engineers (IEEE) in 802.15.4. The aggregation data length is used to describe a length of aggregation data segment, and may start from any field before "attribute mapping table" in data segment 1.

The aggregation control in the aggregation packet header may include a reserved field (Reserved), a packet format version number (Version) reserved for compatibility, a final destination address mode (Final Destination Address Mode), and a service type (Service Type), and their bit counts (Bits) may be 1, 2, 2, and 3 respectively. The final destination address mode is used to describe an address length of the final destination address in the packet header, and the service type may be used as a basis for setting the RTA.

The aggregation data segment in the packet may include at least one data segment. For example, the aggregation data segment may include N data segments, that is, data segment 1 (Data of Node 1), . . . , data segment N (Data of Node N), where N>1. Each data segment may include the attribute mapping table (Attribute Map), a node identity (Node Identity), an attribute 1, and an attribute 2, and their byte counts may be 1, 2/6/8, 1, and 1 respectively. The attribute 1 and the attribute 2 may represent an attribute parameter. For example, when the service type of the packet is a heartbeat packet, the attribute 1 and the attribute 2 may respectively represent a received signal strength indication (RSSI) and transmit power.

The attribute mapping table in each data segment may include a plurality of fields, for example, the reserved field, Attribute 2 Existing (Attribute 2 Existing), Attribute 1 Existing (Attribute 1 Existing), and a node identity mode (Node Identity Mode), and correspondingly, their bit counts may be 4, 1, 1, and 2 respectively. Attribute 2 Existing and Attribute 1 Existing are respectively used to represent whether the second attribute exists and whether the first attribute exists in the data segment. The node identity mode is used to describe an address length of the node identity.

It should be noted that for descriptions of the node identity and the node identity mode, reference may be made to the descriptions of the final destination address and the final destination address mode of the packet respectively. In addition to a case in which each data segment described above includes two attribute parameters, that is, the attribute 1 and the attribute 2, each data segment may not include an attribute parameter, or may include only one attribute parameter, or may include at least three attribute parameters. This is not limited herein. Correspondingly, a quantity of fields "Attribute n Existing" in the attribute mapping table also changes, and a quantity of bits or bytes occupied by a related field also changes.

The following describes a packet, processing method according to an embodiment of the present invention. The method relates to construction of a packet with a structure shown in FIG. 3 and/or processing of a packet with the structure shown in FIG. 3.

Figure 4:
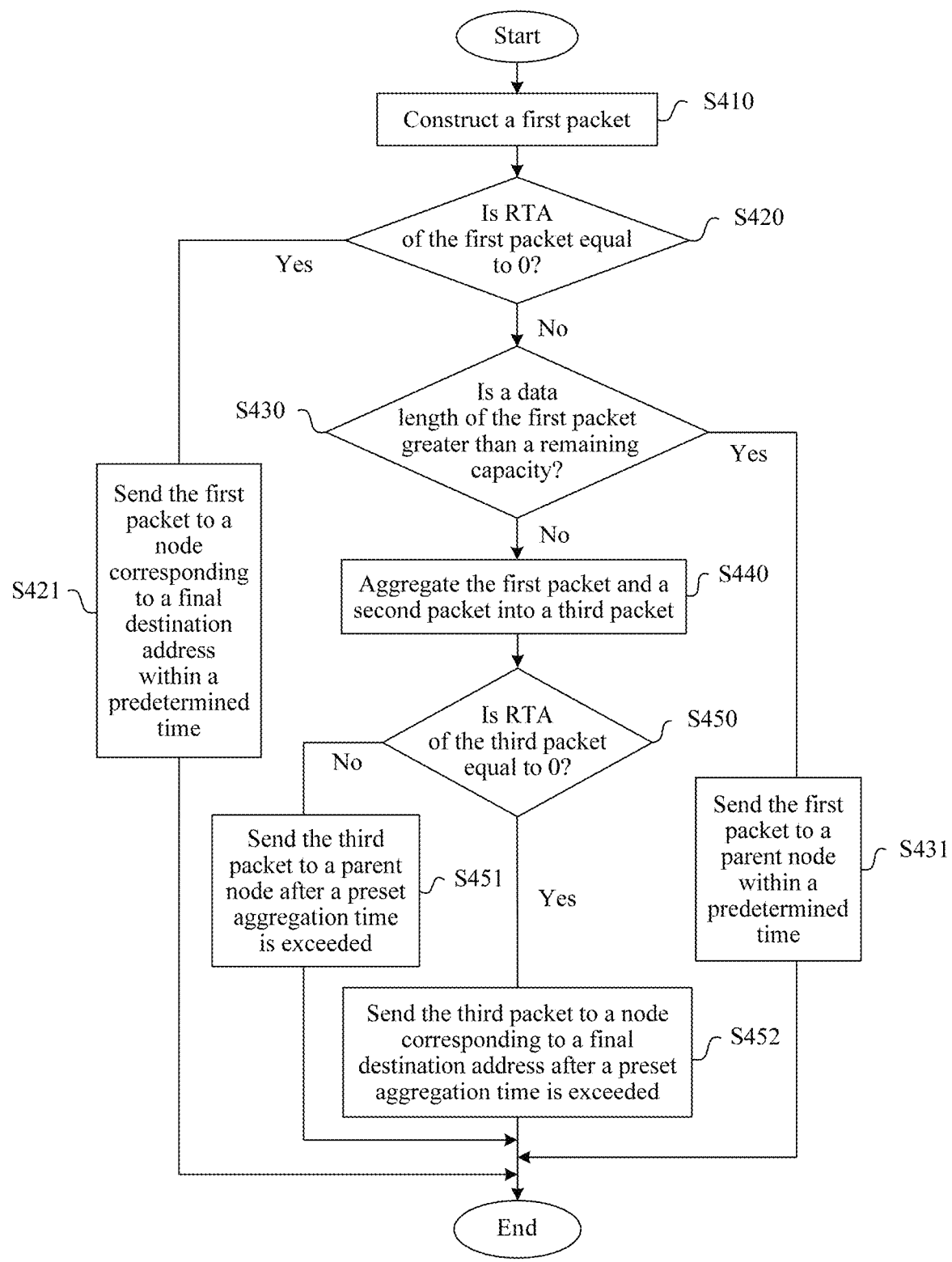
FIG. 4 is a flowchart of a packet processing meth d according to an embodiment of the present invention.

FIG. 4 is a flowchart of a packet processing method according to an embodiment of the present invention. As shown in FIG. 4, this embodiment may include the following steps.

Step S410: A first node generates a first packet based on first data of the first node. The first packet includes a packet header and a packet payload, and the packet header includes a service type, a final destination address, and RTA.

For example, the first data of the first node may include data that is sent by the first node as an initial sender. For example, the first data may include a heartbeat signal generated by the first node. For another example, when the first node is a sensor device, the first data may include real-time sensor data detected in real time or historical sensor data detected in a previous period of time. For another example, when the first node is a computer, the first data may include voice data or text data entered by a user.

For example, that the first node constructs a first packet based on the first data may include: The first node determines the service type, the final destination address, and the RTA of the first packet based on the first data. The RTA may be determined based on parameters such as the service type and/or a device operating status of the first node. The RTA of the first packet is set, so as to control aggregation times of the packet, control an aggregation delay of each packet within a proper range, and ensure normal running of a service.

In an example, the first node determines the RTA of the first packet based on the service type of the first packet.

For example, the first node is a sensor device, and a root node of the first node is a computer. The sensor device may generate the first packet based on real-time data generated in the device, where the service type of the first packet is a real-time sensor packet, and the final destination address may be a media access control (MAC) address of the computer. Correspondingly, an RTA value of the first packet may be set to 1 based on the service type (the real-time sensor packet).

Alternatively, flee sensor device may generate a first packet whose service type is a historical sensor packet based on the historical sensor data generated in the device. Correspondingly, an RTA value of the first packet may be set to 5 based on the service type (the historical sensor packet).

For another example, the first node generates one heartbeat signal, and the heartbeat signal needs to be sent to the root node of the first node, for example, an edge router (BR). Based on the heartbeat signal, it may be determined that the service type of the first packet is the heartbeat packet, and the final destination address is a BR address. Correspondingly, the RTA value of the first packet may be set to 3 based on the service type (the heartbeat packet).

In another example, the first node determines the RTA of the first packet based on the device operating status of the node. For example, when the device operating status is a start status, art operating status, or a power-off status, the RTA of the first packet may be set to 1, 3, or 0 correspondingly.

Step S420; The first node determines whether the RTA of the first packet is 0.

For example, when the RTA of the first packet is not 0, step S430 is performed; or when the RTA of the first packet is 0, step S421 is performed.

Step S430: The first node determines a remaining capacity in a first cache corresponding to the service type and the final destination address of the first packet, and determines whether a data length of the first packet is greater than the remaining capacity. The first cache stores a second packet, and the second packet has a service type and final destination address that are the same as those of the first packet.

For example, the first node may reserve some caches, and divide these caches into a plurality of cache areas. Different cache areas are corresponding to different combinations of destination addresses and service types, and one cache area stores packets that have same final destination addresses and service types. Cache capacities of any two cache areas may be the same or may be different.

For example, a combination of the final destination address and the service type may include any one of the following:
- a gateway address and a heartbeat packet;
- a BR address and a heartbeat packet; or
- a gateway address and a real-time sensor packet.

Correspondingly, the first node may reserve three cache areas each with a cache capacity of 1 KB, which are respectively used to store packets corresponding to the three combinations.

For example, the first node obtains, based on the final destination address and the service type of the first packet, the remaining capacity in the first cache corresponding to the combination of the final destination address and the service type. The remaining capacity may be obtained through calculation by the first node based on a total capacity of the first cache and a data length of the second packet stored in the first cache.

In an example, when a field "aggregation data length" in the second packet refers to a data length of a field after a field "aggregation counts" in FIG. 3, the first node may first use a sum of the "aggregation data length" in the second packet and a data length occupied by an entire packet header as the data length of the second packet, and then uses a difference between the total capacity of the first cache and the data length of the second packet as the remaining capacity in the first cache.

For example, the field "aggregation data length" in the second packet is 0.5 KB, and a data length occupied by the packet header of the second packet is 0.1 KB, and then the data length of the second packet is 0.6 KB. A total capacity of the first cache is 2 KB, and then a remaining capacity in the first cache is 1.4 KB.

For example, the second packet may be a packet received by the first node from a subnode of the first node, and the packet may be a packet on which aggregation processing has been performed, or may be a packet on which no aggregation processing has been performed. Alternatively, the second packet may be a packet generated after the aggregation processing is performed on a plurality of packets that are from a plurality of subnodes of the first node and that have a same destination address and a same service type. Alternatively, the second packet may be a packet generated by the first node based on second data of the first node before the first packet is generated.

It should be noted that when the first node determines that the data length of the first packet is not greater than the remaining capacity in the first cache, and the first cache does not store a packet, the first node may store the first packet in the first cache, and wait tier possible further aggregation. In art example, when storing the first packet, the first node updates the RTA of the first packet to a value obtained after 1 is subtracted from initial RTA.

For example, when the first node determines that the data length of the first packet is not greater than the remaining capacity in the first cache, step S440 and step S450 are performed; or when the first node determines that the data length of the first packet is greater than the remaining capacity in the first cache, step S431 is performed.

Step S440: The first node aggregates the first packet and the second packet into a third packet.

In an example, a data length of the first packet is 0.3 KB, and a remaining capacity in the first cache is 0.8 KB. Therefore, the first node may aggregate the first packet and the second packet in the first cache into the third packet.

In another example, a data length of the first packet is 0.5 KB, and a remaining cache capacity in the first cache is 0.5 KB. Therefore, the first node may aggregate the first packet and the second packet in the first cache into the third packet.

For example, that the first node aggregates the first packet and the second packet into a third packet may include: The first node appends a data segment of the first packet to the end of a data segment of the second packet, and the first node sets the RTA of the third packet to a minimum value in the RTA of the second packet and a value obtained after 1 is subtracted from the RTA of the first packet.

Figure 5A:
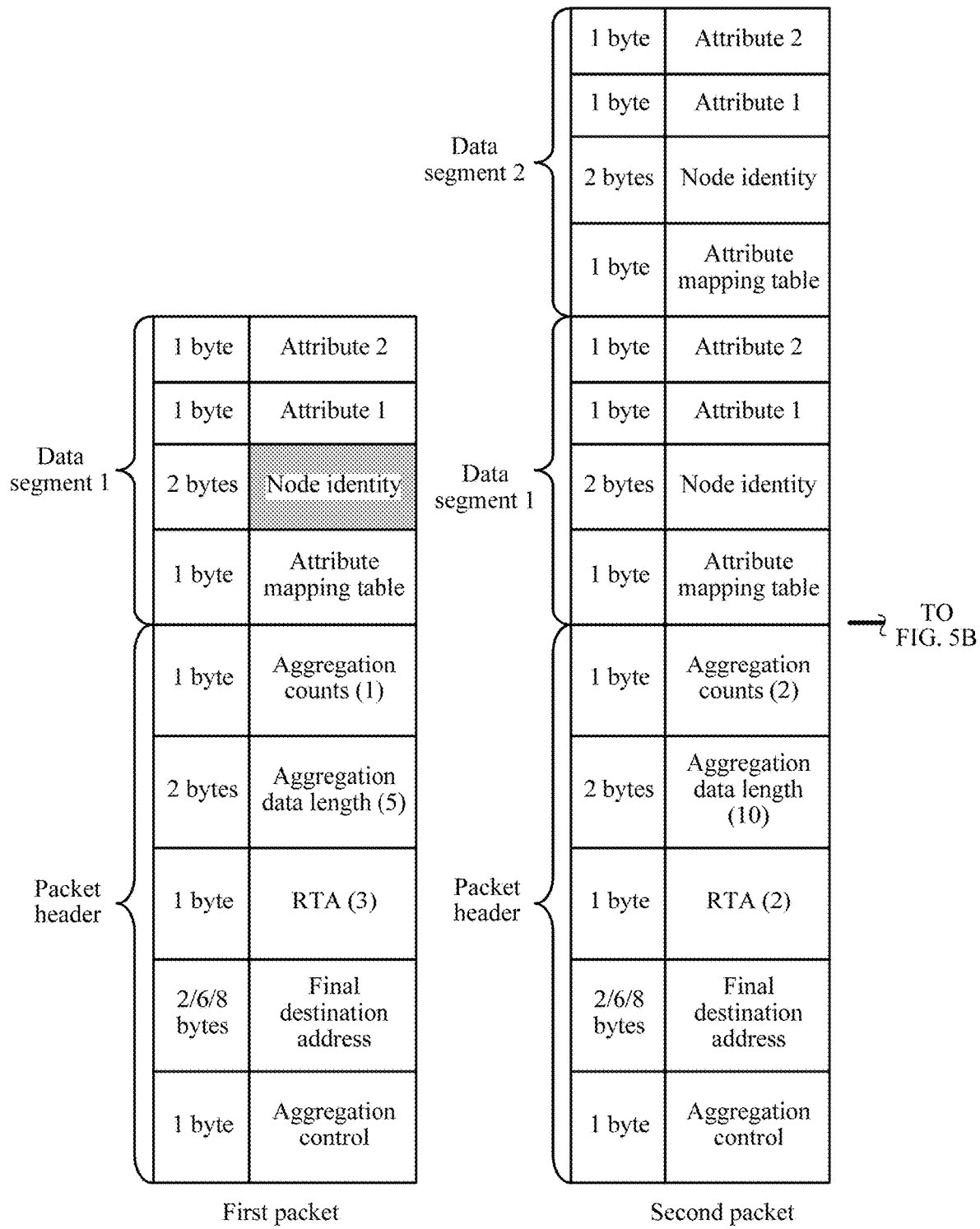
FIG. 5A and FIG. 5B are a schematic diagram of an aggregation status of a packet according to an embodiment of the present invention.
Figure 5B:
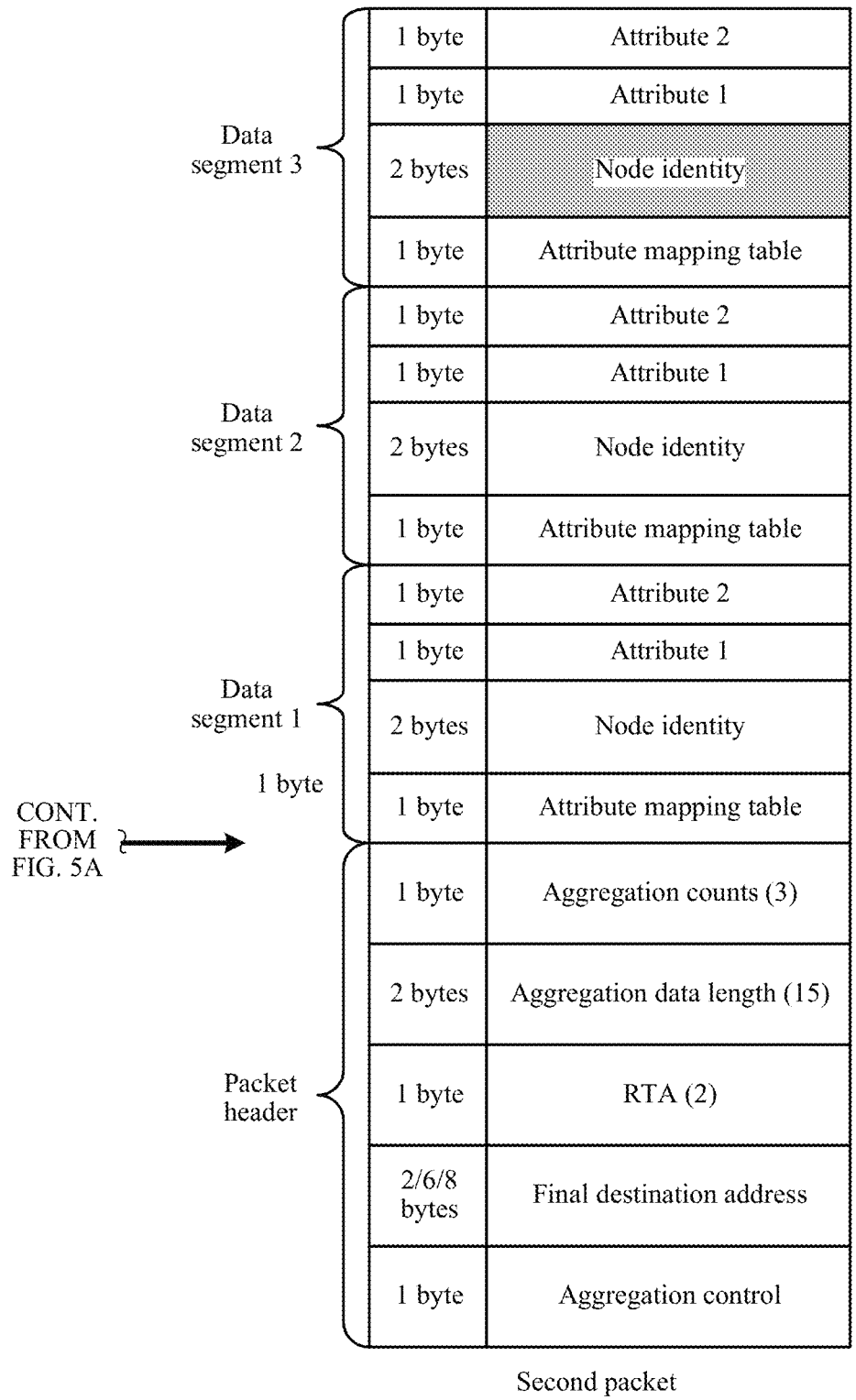

In an example, as shown in FIG. 5A and FIG. 5B, the data segment of the first packet includes one data segment of the first node, the data segment of the second packet includes two aggregated data segments from two nodes, and RTA of the first packet and RTA of the second packet are 3 and 2 respectively. The first node appends one data segment of the first packet to the end of two data segments of the second packet, and sets the RTA of the third packet to a minimum value 2 in 2 (1 is subtracted from the RTA of the first packet) and 2 (the RTA of the second packet).

Figure 6A:
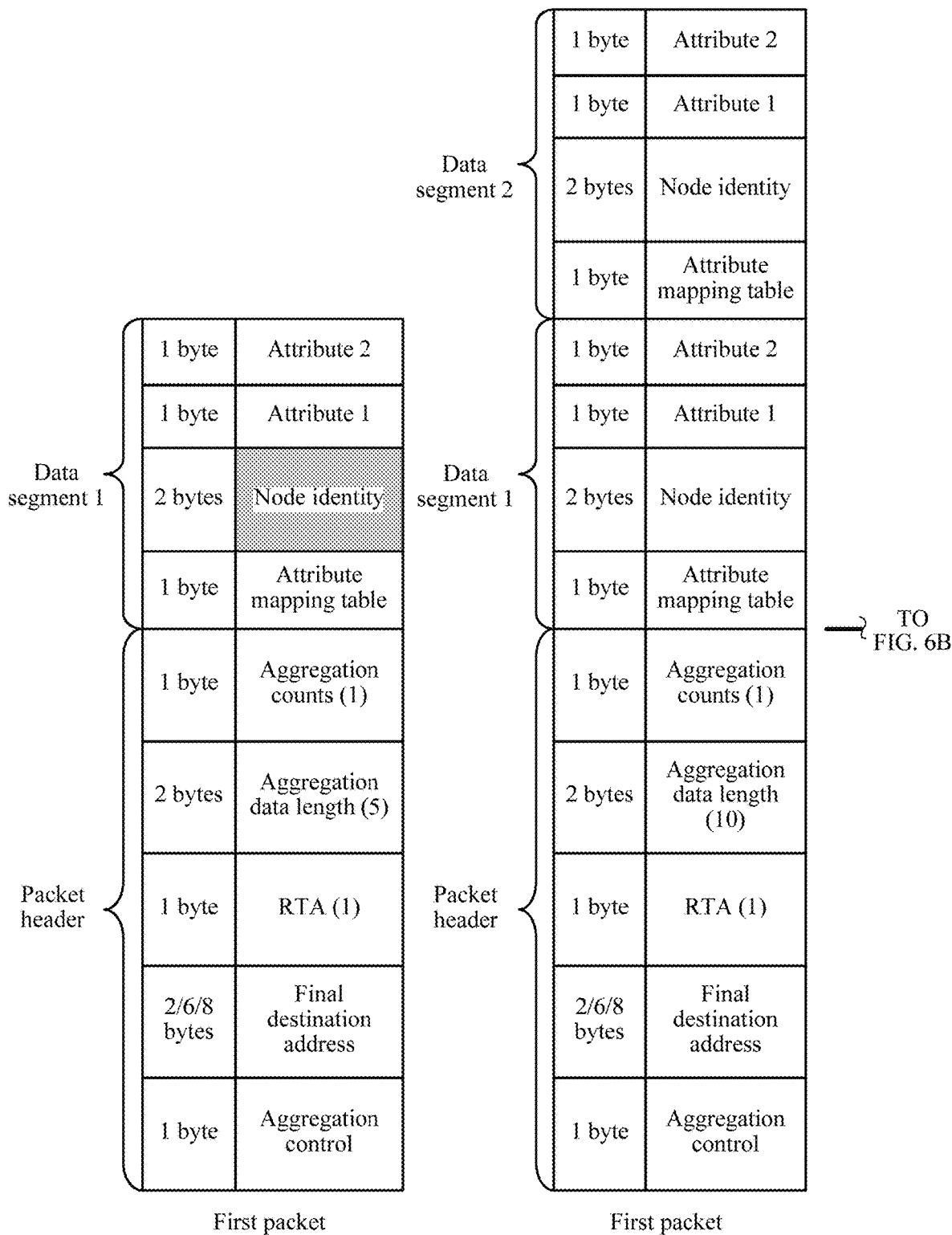
FIG. 6A and FIG. 6B are a schematic diagram of an aggregation status of another packet according to an embodiment of the present invention.
Figure 6B:
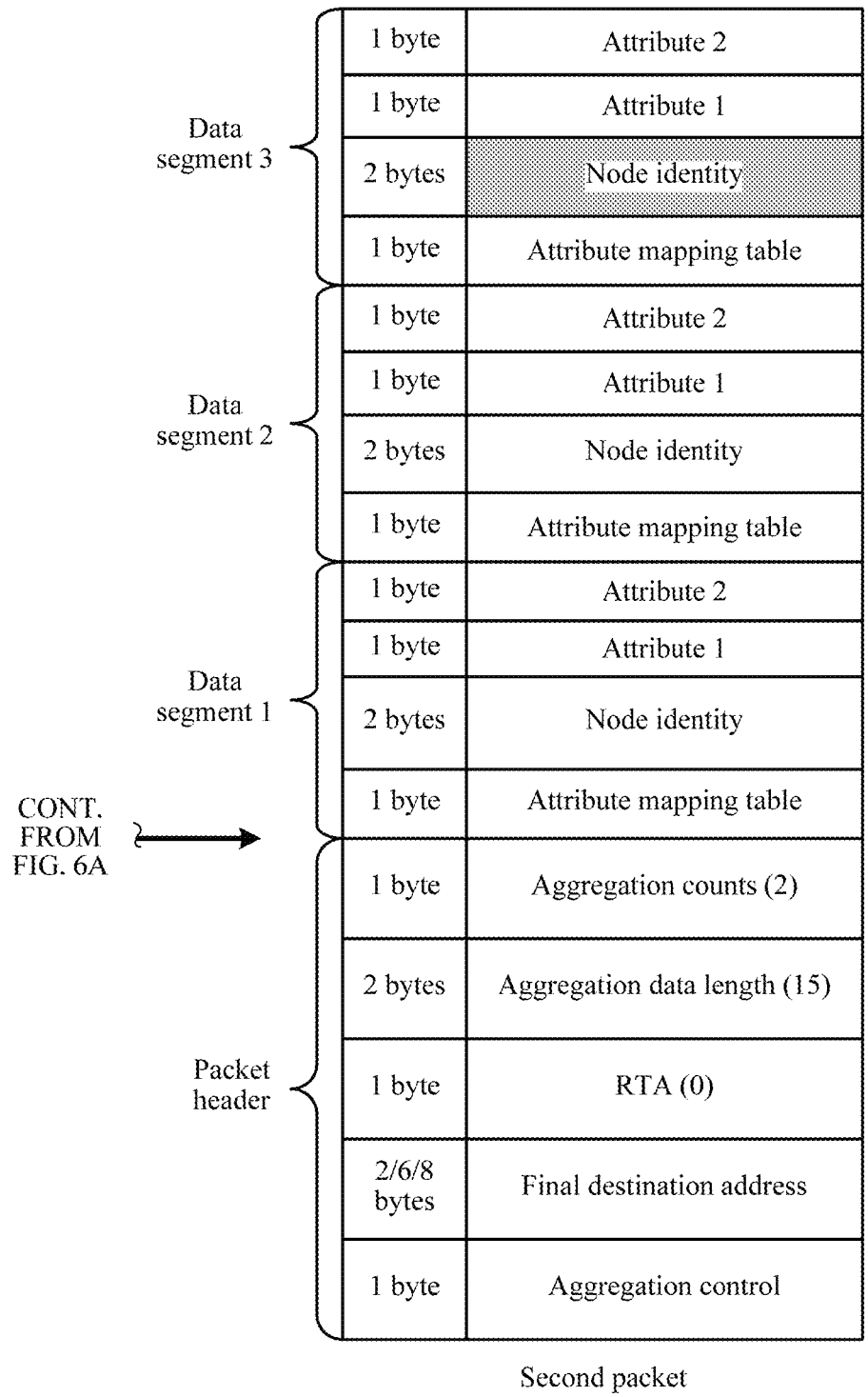

In another example, as shown in FIG. 6A and FIG. 6B, a data segment of the first packet includes one data segment of the first node, a data segment of the second packet includes two data segments of one node, and RTA of the first packet and RTA of the second packet are both 1. The first node appends the data segment of the first packet to the end of two data segments of the second packet, and sets the RTA of the third packet to a minimum value 0 in 0 (1 is subtracted from the RTA of the first packet) and 1 (the RTA of the second packet).

For example, that the first node aggregates the first packet and the second packet into a third packet may further include: determining "aggregation data length" in the third packet based on "aggregation data length" in the first packet and "aggregation data length" in the second packet; and determining "aggregation counts" in the third packet based on "node identity" in the first packet and "node identity" in the second packet.

In an example, as shown in FIG. 6A and FIG. 6B, the "aggregation data length" in the first packet and the "aggregation data length" in the second packet are respectively 5 bytes and 10 bytes. Therefore, it may be determined that the "aggregation data length" in the third packet is 1 bytes. A total of two different "node identities" are included in the first packet and the second packet. Therefore, it may be determined that "aggregation counts" in the third packet is 2.

In the foregoing steps, the first node constructs the first packet based on the first data of the first node, and aggregates the first packet and the second packet into the third packet.

In an example, after aggregating the first packet and the second packet into the third packet, the first node continues to wait for the possible further aggregation until a preset aggregation time is exceeded.

Step S450: The first node determines whether RTA of the third packet is 0.

For example, when the RTA of the third packet is 0, step S451 is performed; or when the RTA of the third packet is 0, step S452 is performed.

Step S451: The first node sends the third packet to a parent node of the first node after a preset aggregation time is exceeded.

For example, the preset aggregation time is an aggregation waiting period set by the first node, for example, 10 ms or 5 ms. The preset aggregation time and the RTA of the packet are set, so as to control an aggregation delay of the packet within a proper range.

For example, a network model in which the first node is located includes a network layer and an application layer. Step S410 to step S440 are implemented at the application layer, and packet transmission (for example, step S451) among a plurality of nodes is implemented at the network layer.

For example, after aggregating the first packet and the second packet into the third packet at the application layer, the first node uses an address of the parent node of the first node as a network destination address of the third packet at the network layer, and encapsulates the network destination address into a network layer encapsulation header of the third packet. In this manner, when the RTA of the third packet is not 0, that is, when the third packet can be continuously aggregated, the network destination address of the third packet is set to be the address of the parent node of the first node, so that after receiving the third packet, the parent node may extract the third packet into the application layer based on the network destination address (the address of the parent node) of the packet, and further determine whether the third packet can be further aggregated.

Step S452: The first node sends the third packet to a node corresponding to a final destination address in the third packet a tier a preset aggregation time is exceeded.

When the first node determines that the RTA of the third packet is 0 in step S450, S452 is performed, that is, the third packet is sent to a node corresponding to a final destination address in the third packet after a preset aggregation time is exceeded.

For example, after aggregating the first packet and the second packet into the third packet at the application layer, the first node uses a final destination address included in the packet header of the third packet as the network destination address of the third packet at the network layer, and encapsulates the network destination address into the network layer encapsulation header of the third packet. In this manner, when the RTA of the third packet is 0, that is, when the third packet cannot be continuously aggregated, the network destination address of the third packet is set to be the final destination address, so that after receiving the third packet, the parent node of the first node may not extract the third packet into the application layer, but directly forwards the third packet based on the network destination address (the final destination address) of the third packet.

Step S431: The first node sends the first packet to a parent node of the first node within a predetermined time.

When the first node determines that the data length of the first packet is greater than the remaining cache capacity in step S430, S431 is performed, that is, the first packet is sent to a parent node of the first node within a predetermined time.

For example, if the data length of the first packet is greater than the remaining capacity, in this case, the first node does not need to aggregate the first packet and the second packet in the first cache, but sends the first packet to the parent node of the first node within the predetermined time.

For example, the predetermined time may be a relatively small interval set for a network system in which the node or the node is located, for example, 0.1 ms or 0.5 ms. The predetermined time in S431 is less than the preset aggregation time mentioned in step S451 and step S452.

In an example, a data length of the first packet is 0.6 KB, which is greater than a remaining cache capacity 0.5 KB of the first cache. In this case, the first node sends the first packet to the parent node of the first node within a predetermined time 0.5 ms.

For example, the first node uses the address of the parent node of the first node as the network destination address of the first packet at the network layer, and encapsulates the network destination address into the network layer encapsulation header of the first packet, so that after receiving the first packet, the parent node of the first node may extract the first packet into the application layer, and further determine whether the first packet can be aggregated.

Step S421: The first node sends the first packet to a parent node of the first node within a predetermined time.

When the first node determines that the RTA of the first packet is 0 in step S420, S421 is performed, that is, the first packet is sent to the parent node of the first node within the predetermined time.

For example, for a description of the predetermined time in S421, refer to the description of the predetermined time in step S431.

For example, the first node uses the final destination address of the first packet as the network destination address of the first packet at the network layer, and encapsulates the network destination address into the network layer encapsulation header of the first packet, so that after receiving the first packet, the parent node of the first node may not extract the first packet into the application layer, but directly forwards the first packet based on the network destination address (the final destination address) of the first packet.

It can be learned that according to the packet processing method provided in this embodiment, the first node constructs the first packet based on the data of the first node, sets the final destination address, the service type, and the residual times to aggregation RTA for the first packet, and determines the remaining capacity in the first cache corresponding to a combination of the final destination address and the service type, and the second packet stored in the first cache. When the data length of the first packet is not greater than the remaining capacity, the first packet and the second packet in the first cache are aggregated into the third packet. Times to aggregation and an aggregation data length of a packet are controlled, so as to effectively limit a transfer delay of the packet within a proper range, alleviate a bandwidth pressure of a transmission path between nodes, and ensure normal running of a service. Packets that have same service types and final destination addresses are aggregated for sending, so as to resolve the following problem: Upstream packets occupy high network bandwidth, which affects normal running of a service.

Figure 7:
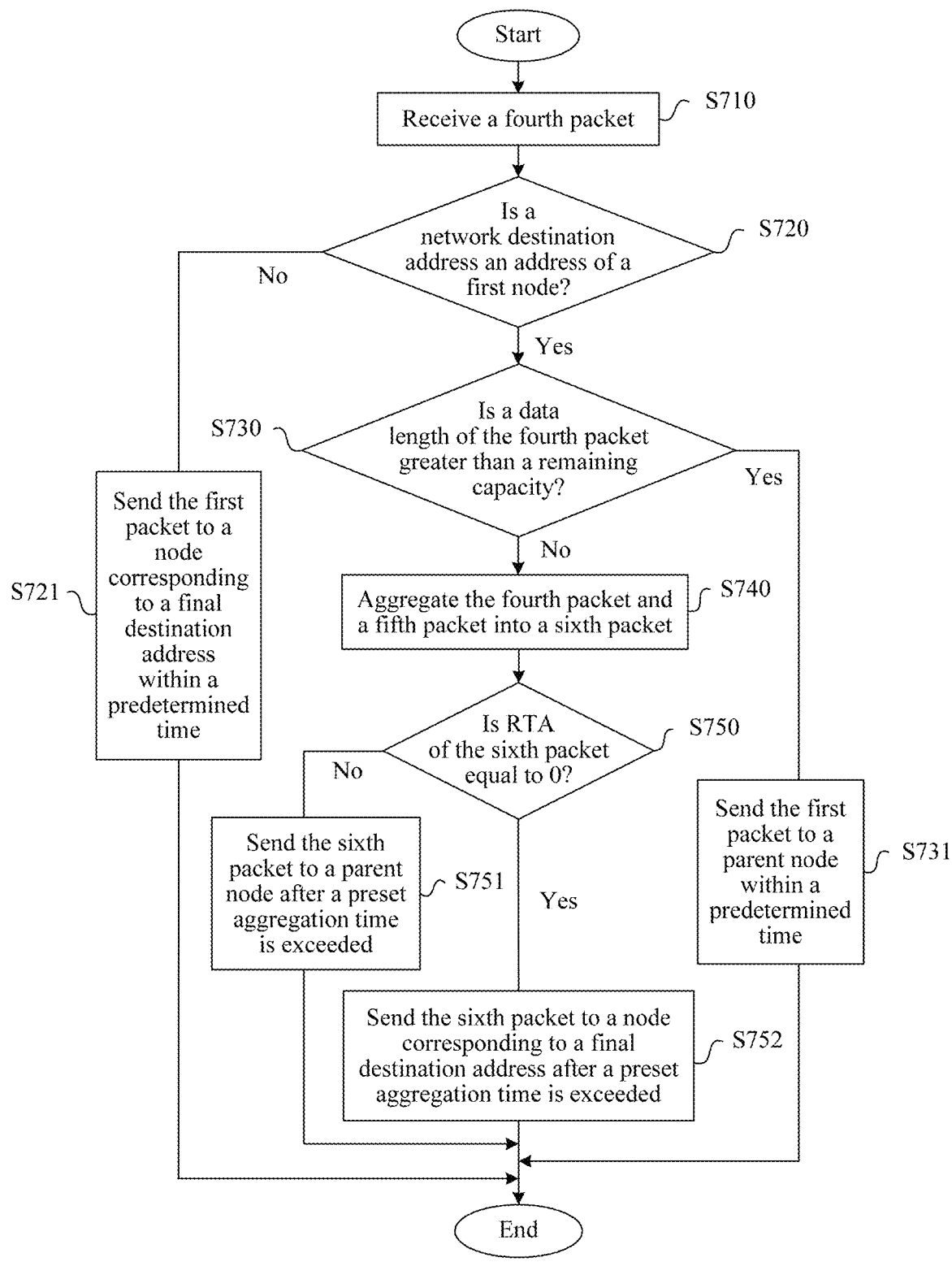
FIG. 7 is a flowchart of another packet processing method according to an embodiment of the present invention.

FIG. 7 is a flowchart of another packet processing method according to an embodiment of the present invention. As shown in FIG. 7, this embodiment may include the following steps.

Step S710: A first node receives a fourth packet sent by a first subnode of the first node. The fourth packet includes a packet header and a network layer encapsulation header, the packet header includes a service type, a final destination address, and residual times to aggregation RTA, and the network layer encapsulation header includes a network destination address. For a description of the packet header of the fourth packet in step S710, refer to the description of the packet structure in FIG. 3 and the description of the packet header in step S410 in FIG. 4.

Step S720: The first node determines whether the network destination address of the fourth packet is an address of the first node.

When the first node determines that the network destination address of the fourth packet is not the destination address of the first node, step S721 is performed; or when the first node determines that the network destination address of the fourth packet is the destination address of the first node, step S730 is performed.

Step S721: The first node sends the fourth packet to a node corresponding to the network destination address within a predetermined time.

For a description of step S721, refer to the description of step S421.

Step S730; The first node determines a remaining capacity in a fourth cache corresponding to a combination of the service type and the final destination address of the fourth packet, and determines whether a data length of the fourth packet is greater than the remaining capacity.

When the first node determines that the network destination address of the fourth packet is the destination address of the first node in step S720, S730 is performed, that is, a remaining capacity in a fourth cache corresponding to a combination of the service type and the final destination address of the fourth packet is determined, and whether a data length of the fourth packet is greater than the remaining capacity is determined.

The fourth cache stores a fifth packet, and the fifth packet includes a service type and a final destination address that, are the same as those of the fourth packet. The fifth packet may be a fifth packet generated by the first node based on data of the first node, or may be a fifth packet received by the first node from a second subnode of the first node. A first subnode and the second subnode of the first node may be a same node or may be different nodes.

For a description of step S730, refer to the description of step S430.

When the first node determines that the data length of the fourth packet is not greater than the remaining capacity, step S740 is performed; or when the first node determines that the data length of the fourth packet is greater than the remaining capacity, step S731 is performed.

Step S731: The first node sends the fourth packet to a parent mode of the first node within a predetermined time.

For a description of step S731, refer to the description of step S431.

Step S740: The first node aggregates the fourth packet and the fifth packet into a sixth packet.

When the first node determines, that the data length of the fourth packet is not greater than the remaining capacity in step S730, step S740 is performed, that is, the fourth packet and the fifth packet are aggregated into a sixth packet. For a description of step S740, refer to the description of step S440.

Step S750: The first node determines whether RTA of the sixth packet is 0.

For example, when the RTA of the sixth packet is not 0, step S751 is performed; or when the RTA of the sixth packet is 0, step S752 is performed.

For a description of step S750, refer to the description of step S450.

Step S751: The first node sends the sixth packet to a parent node of the first node after a preset aggregation time is exceeded.

For a description of step S751, refer to the description of step S451.

Step S752: The first node sends the sixth packet to a node corresponding to a final destination address in the sixth packet after a preset aggregation time is exceeded.

When the first node determines that the RTA oldie sixth packet is 0 in step S750, S752 is performed, that is, the sixth packet is sent to a node corresponding to a final destination address in the sixth packet after a preset aggregation time is exceeded.

For a description of step S752, refer to the description of step S452.

It should be noted that when the first node determines that the data length of the fourth packet is not greater than the remaining capacity in the fourth cache in step S730, and the fourth cache does not store a packet, the first node may store the fourth packet in the fourth cache, and wait for possible further aggregation until the preset aggregation time is exceeded. In an example, when storing the fourth packet, the first node updates the REA of the fourth packet to a value obtained after 1 is subtracted from initial RTA.

It can be learned that according to the packet processing method provided in this embodiment, the first node receives the fourth packet, and determines the remaining capacity in the fourth cache corresponding to the combination of the destination address and the service type of the fourth packet; and the fourth cache stores the fifth packet. When the data length of the fourth packet is not greater than the remaining capacity, the fourth packet and the fifth packet are aggregated into the sixth packet. Times to aggregation and an aggregation data length of a packet are controlled, so as to effectively limit a transfer delay of the packet within a proper range, alleviate a bandwidth pressure of a transmission path between nodes, and ensure normal running of a service.

Figure 8:
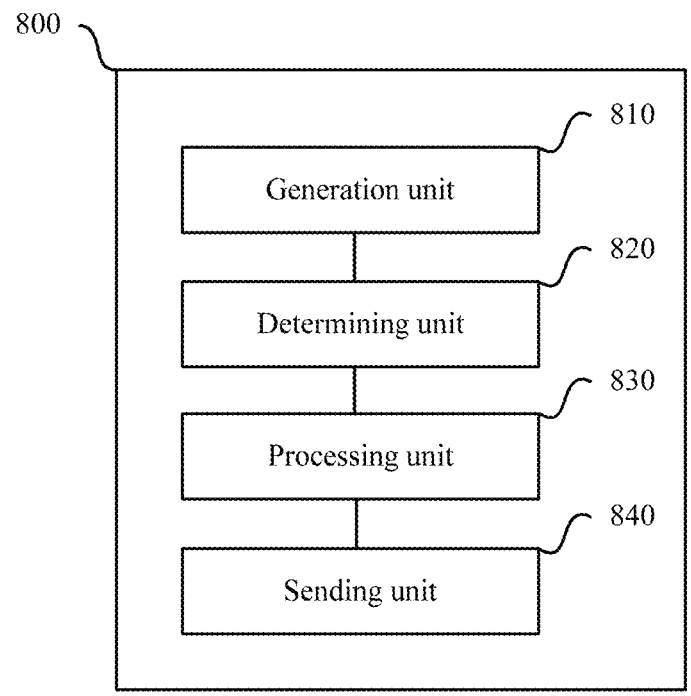
FIG. 8 is a schematic structural diagram of a packet processing apparatus according to an embodiment of the present invention.

Corresponding to the packet processing method, a plurality of embodiments in the present invention further provide a packet processing apparatus, and the apparatus may be applied to a first node. FIG. 8 is a schematic structural diagram of a packet processing apparatus according to an embodiment of the present invention. As shown in FIG. 8, the apparatus 800 includes:

a generation unit 810, configured to generate a first packet based on data of the first node, where the first packet includes a packet header, and the packet header includes a service type, a final destination address, and residual times to aggregation RTA;

a determining unit 820, configured to: when the RTA of the first packet is not 0, determine a remaining capacity in a first cache corresponding to the service type and the final destination address, where the first cache stores a second packet, and the second packet has a service type and a final destination address that are the same as those of the first packet; and a processing unit 830, configured to: when a data length of the first packet is not greater than the remaining capacity, aggregate the first packet and the second packet into a third packet, where a packet header of the third packet includes the service type the final destination address, and the RTA of the third packet, and the RTA of the third packet is a minimum value in the RTA of the second packet and a value obtained after 1 is subtracted from the RTA of the first packet.

In a possible implementation, the apparatus further includes: a sending unit 840, configured to: when the RTA of the third packet is 0, send the third packet to a node corresponding to the final destination address after a preset aggregation time is exceeded; or when the RTA of the third packet is not 0, send the third packet to a parent node of the first node after a preset aggregation time is exceeded.

In a possible implementation, the apparatus further includes: the sending unit 840, configured to: when the RTA of the first packet is 0, send the first packet to a node corresponding to the final destination address within a predetermined time.

In a possible implementation, the apparatus further includes: the sending unit 840 configured to: when the data length of the first packet is greater than the remaining capacity, send the first packet to a parent node of the first node within a predetermined time.

According to the packet processing apparatus provided in this embodiment of the present invention, the generation unit 810 constructs a first packet based on data of the first node, and sets a final destination address, a service type, and residual times to aggregation RTA for the first packet, the determining unit 820 determines a remaining capacity in a first cache corresponding to a combination of the final destination address and the service type, and the second packet stored in the first cache; and when the data length of the first packet is not greater than the remaining capacity, the processing unit 830 aggregates the first packet and the second packet in the first cache into the third packet. Times to aggregation and an aggregation data length of a packet are controlled, so as to effectively limit a transfer delay of the packet within a proper range, alleviate a bandwidth pressure of a transmission path between nodes, and ensure normal running of a service.

Figure 9:
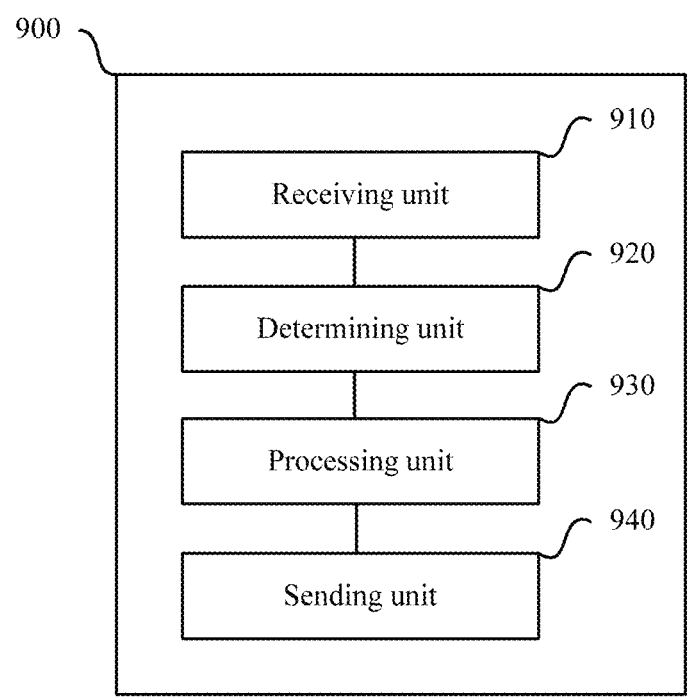
FIG. 9 is a schematic structural diagram of another packet processing apparatus according to an embodiment of the present invention.

FIG. 9 is a schematic structural diagram of another packet processing apparatus according to an embodiment of the present invention. As shown in FIG. 9, the apparatus 900 may include:

a receiving unit 910, configured to receive a fourth packet sent by a first subnode of the first node, where the fourth packet includes a packet header and a network layer encapsulation header, the packet header includes a service type, a final destination address, and residual times to aggregation RTA, and the network layer encapsulation header includes a network destination address;

a determining unit 920, configured to: when the network destination address is an address of the first node, determine a remaining capacity in a fourth cache corresponding to the service type and the final destination address, where the fourth cache stores a fifth packet, and the fifth packet has a service type and a final destination address that are the same as those of the fourth packet; and a processing unit 930, configured to: when a data length of the fourth packet is not greater than the remaining capacity, aggregate the fourth packet and the fifth packet into a sixth packet, where a packet header of the sixth packet includes the service type, the final destination address, and the RTA of the sixth packet, and the RTA of the sixth packet is a minimum value in the RTA of the fifth packet and a value obtained after 1 is subtracted from the RTA of the fourth packet.

In a possible implementation, the apparatus further includes: a sending unit 940, configured to: when the network destination address is not the address of the first node, send the fourth packet to a node corresponding to the network destination address within a predetermined time.

According to the packet processing apparatus provided in this embodiment of the present invention, the receiving unit 910 receives the fourth packet; the determining unit 920 determines the remaining capacity in the fourth cache corresponding to a combination of the destination address and the service type of the fourth packet, and the fourth cache stores the fifth packet; and when the data length of the fourth packet is not greater than the remaining capacity, the processing unit 930 aggregates the fourth packet and the fifth packet into the sixth packet. Times to aggregation and an aggregation data length of a packet are controlled, so as to effectively limit a transfer delay of the packet within a proper range, alleviate a bandwidth pressure of a transmission path between nodes, and ensure normal naming of a service.

Figure 10:
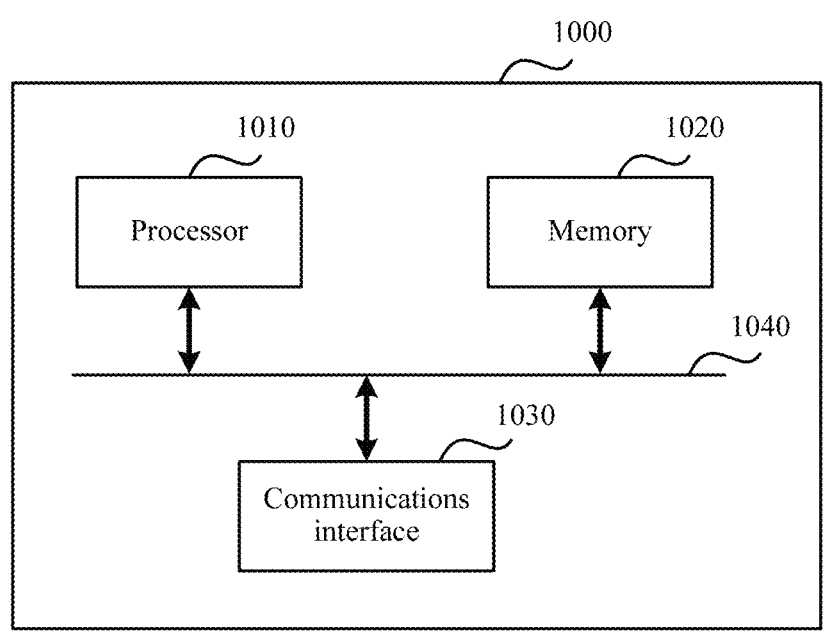
FIG. 10 is a schematic structural diagram of still another packet processing apparatus according to an embodiment of the present invention.

FIG. 10 is a schematic structural diagram of still another packet processing apparatus according to an embodiment of the present invention. As shown in FIG. 10, the apparatus 1000 includes a processor 1010, a memory 1020, and a communications interface 1030. The processor 1010, the memory 1020, and the communications interface 1030 may be connected to each other by using a bus 1040. The bus 1040 may be classified into an address bus 1040, a data bus 1040, a control bus 1040, and the like. For ease of representation, only one thick line is used in the figure to represent the bus, but this does not mean that there is only one, bus 1040 or one type of bus 1040. The memory 1020 is configured to store a packet and neighbor information, and may include a volatile memory 1020, for example, a random access memory 1020 (RAM). The communications interface 1030 is configured for communication between the node device and another node, and there may be one or more communication interfaces 1030. The communications interface 1030 includes a wired or wireless interface. A typical wireless interface is a radio frequency (RF) transceiver, and may be an 802.11 interface, an 802.15.4 interface, a cellular network communications interface, a ZigBee interface, a combination thereof, or the like. The processor 1010 may be a central processing unit (CPU), a network processor (NP), a microcontroller (MCU), or a combination thereof. The processor 1010 may further include a hardware chip. The hardware chip may be an application-specific integrated circuit (ASIC), a programmable ionic device (PLD), or a combination thereof. The PLD may be a complex programmable logic device (CPLD), a field-programmable logic gate array (FPGA), generic array logic (GAL), or any combination thereof.

When executing executable code stored in the memory 1020, the processor 1010 may be configured to implement the packet processing method in either of the embodiments in FIG. 4 and FIG. 7.

In the foregoing specific implementations, the objective, technical solutions, and benefits of this application are further described in detail. It should be understood that the foregoing descriptions are merely specific implementations of this application, but are not intended to limit the protection scope of this application. Any modification, equivalent replacement, or improvement made without departing from the principle of this application should fall within the protection scope of this application.

What is claimed is:

1. A packet processing method, comprising:
   generating, by a first node, a first packet based on data of the first node, wherein the first packet comprises a packet header, and the packet header comprises a service type, a final destination address, and residual times to aggregation (RTA);
   when the RTA of the first packet is not 0, determining, by the first node, a remaining capacity in as first cache corresponding to the service type and the final destination address, wherein the first cache stores a second packet, and the second packet has a service type and a final destination address that are the same as those of the first packet; and
   when a data length of the first packet, is not greater than the remaining capacity, aggregating, by the first node, the first packet and the second packet into a third packet, wherein a packet header of the third packet comprises the service type, the final destination address, and the RTA of the third packet, and the RTA of the third packet is a minimum of the RTA of the second packet and a value obtained after 1 is subtracted from the RTA of the first packet.

2. The method according to claim 1, further comprising:
when the RTA of the third packet is 0, sending, by the first node, the third packet to a node corresponding to the final destination address after a preset aggregation time is exceeded; or
when the RTA of the third packet is not 0, sending, by the first node, the third packet to a parent node of the first node after the preset aggregation time is exceeded.

3. The method according to claim 1, further comprising:
when the RTA of the first packet is 0, sending, by the first node, the first packet to a node corresponding to the final destination address within a predetermined time.

4. The method according to claim 1, further comprising:
when the data length of the first packet is greater than the remaining capacity, sending, by the first node, the first packet to a parent node of the first node within a predetermined time.

5. A packet processing apparatus, wherein the apparatus is applied to a first node and comprises:
a generation unit, configured to generate a first packet based on data of the first node, wherein the first packet comprises a packet header, and the packet header comprises a service type, a final destination address, and residual times to aggregation (RTA);
a determining unit, configured to: when the RTA of the first packet is not 0, determine a remaining capacity in a first cache corresponding to the service type and the final destination address, wherein the first cache stores a second packet, and the second packet has a service type and a final destination address that are the same as those of the first packet; and
a processing unit, configured to: when a data length of the first packet is not greater than the remaining capacity, aggregate the first packet and the second packet into a third packet, wherein a packet header of the third packet comprises the service type, the final destination address, and the RTA of the third packet, and the RTA of the third packet is a minimum of the RTA of the second packet and a value obtained after 1 is subtracted from the RTA of the first packet.

6. The apparatus according to claim 5, further comprising:
a sending unit, configured to:
when the RTA of the third packet is 0, send the third packet to a node corresponding to the final destination address after a preset aggregation time is exceeded; or
when the RTA of the third packet is not 0, send the third packet to a parent node of the first node after the preset aggregation time is exceeded.

7. The apparatus according to claim 5, further comprising:
a sending unit, configured to: when the RTA of the first packet is 0, send the first packet to a node corresponding to the final destination address within a predetermined time.

8. The apparatus according to claim 5, further comprising:
a sending unit, configured to: when the data length of the first packet is greater than the remaining capacity, send the first packet to a parent node of the first node within a predetermined time.

9. A packet processing apparatus, wherein the apparatus is applied to a first node and comprises:
a receiving unit, configured to receive a fourth packet sent by a subnode of the first node, wherein the fourth packet comprises a packet header and a network layer encapsulation header, the packet header comprises a service type, a final destination address, and residual times to aggregation (RTA), and the network layer encapsulation header comprises a network destination address;
a determining unit, configured to: when the network destination address is an address of the first node, determine a remaining capacity in a fourth cache corresponding to the service type and the final destination address, wherein the fourth cache stores a filth packet, and the fifth packet has a service type and a final destination address that are the same as those of the fourth packet; and
a processing unit, configured to: when a data length of the fourth packet is not greater than the remaining capacity, aggregate the fourth packet and the fifth packet into a sixth packet, wherein a packet header of the sixth packet comprises the service type, the final destination address, and the RTA of the sixth packet, and the RTA of the sixth packet is a minimum of the RTA of the fifth packet and a value obtained after 1 is subtracted from the RTA of the fourth packet.

10. The apparatus according to claim 9, further comprising:
a sending unit, configured to: when the network destination address is not the address of the first node, send the fourth packet to a node corresponding to the network destination address within a predetermined time.

* * * * *